(12) United States Patent
Jung et al.

(10) Patent No.: US 11,381,113 B2
(45) Date of Patent: *Jul. 5, 2022

(54) WIRELESS POWER TRANSMISSION DEVICE

(71) Applicant: GE Hybrid Technologies, LLC, Niskayuna, NY (US)

(72) Inventors: Chun Kil Jung, Seoul (KR); Hak Do Kim, Suwon-si (KR); Sang Youn Noh, Suwon-si (KR)

(73) Assignee: GE Hybrid Technologies, LLC, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,667

(22) Filed: Dec. 17, 2020

(65) Prior Publication Data
US 2021/0104916 A1 Apr. 8, 2021

Related U.S. Application Data

(63) Continuation of application No. 16/678,373, filed on Nov. 8, 2019, now Pat. No. 10,903,694, which is a
(Continued)

(51) Int. Cl.
*H02J 50/12* (2016.01)
*H02J 50/40* (2016.01)
(Continued)

(52) U.S. Cl.
CPC ............. *H02J 50/12* (2016.02); *H01F 38/14* (2013.01); *H02J 50/40* (2016.02); *H02J 7/025* (2013.01)

(58) Field of Classification Search
None
See application file for complete search history.

(56) References Cited

U.S. PATENT DOCUMENTS 10,523,055 B2   12/2019  Jung et al.
10,541,563 B2    1/2020  Jung et al.
(Continued)

FOREIGN PATENT DOCUMENTS

KR    1020070017804    2/2007
KR    1020130032293    4/2013
(Continued)

OTHER PUBLICATIONS

"PCT Application No. PCT/KR2016/000504 International Preliminary Report on Patentability", dated Jul. 18, 2017, 7 pages.
(Continued)

*Primary Examiner* — Cassandra F Cox
(74) *Attorney, Agent, or Firm* — DeLizio, Peacock, Lewin & Guerra, PLLC

(57) ABSTRACT

A coil structure for wireless power transmission is provided. The coil structure comprises: a primary resonance coil wound in a spiral shape around a centripetal point; a primary induction coil, which supplies power to the primary resonance coil in a nonconnected state with an input or output terminal of the primary resonance coil and is wound in a spiral shape on a substantially same plane around a substantially same centripetal point as the centripetal point; a switch configured to be parallel with the primary resonance coil so as to control the ON and OFF of an operation of the primary resonance coil; and a capacitor coupled to the primary resonance coil so as to form a magnetic resonance with the primary resonance coil.

20 Claims, 11 Drawing Sheets

Related U.S. Application Data continuation of application No. 15/544,025, filed as application No. PCT/KR2016/000504 on Jan. 18, 2016, now Pat. No. 10,523,055.

(60) Provisional application No. 62/104,092, filed on Jan. 16, 2015.

(51) Int. Cl.
*H01F 38/14* (2006.01)
*H02J 7/02* (2016.01)

(56) References Cited

U.S. PATENT DOCUMENTS

| | | |
|---|---|---|
| 10,903,694 B2 * | 1/2021 | Jung ................. H01F 38/14 |
| 2013/0099583 A1 | 4/2013 | Lee |
| 2013/0127405 A1 | 5/2013 | Scherer et al. |
| 2014/0285140 A1 | 9/2014 | Jung |
| 2015/0207333 A1 | 7/2015 | Baarman et al. |
| 2018/0159376 A1 | 6/2018 | Jung et al. |
| 2018/0159377 A1 | 6/2018 | Jung et al. |
| 2018/0212467 A1 | 7/2018 | Jung et al. |
| 2018/0219432 A1 | 8/2018 | Podkamien et al. |
| 2020/0091771 A1 | 3/2020 | Jung et al. |

FOREIGN PATENT DOCUMENTS

| | | |
|---|---|---|
| KR | 1020130054897 | 5/2013 |
| WO | 2016114637 | 7/2016 |

OTHER PUBLICATIONS

"PCT Application No. PCT/KR2016/000504 International Search Report", dated Apr. 18, 2016, 2 pages.

"PCT Application No. PCT/KR2016/000504 Written Opinion", dated Apr. 18, 2016, 6 pages.

"Qi System Description Wireless Power Transfer", Wireless Power Consortium, vol. 1:Low Power, Part 1:Interface Definition, Version 1.0.1, Oct. 2010, 88 pages.

"U.S. Appl. No. 15/544,025 Office Action", dated Apr. 5, 2019, 6 pages.

* cited by examiner

WIRELESS POWER TRANSMISSION DEVICE

RELATED MATTERS

This application is a continuation of U.S. patent application Ser. No. 16/678,373, filed Nov. 8, 2019, which is a continuation of U.S. patent application Ser. No. 15/544,025, filed on Nov. 27, 2017, which is a National Stage Entry of International Patent Application Serial No. PCT/KR2016/000504, filed on Jan. 18, 2016, which claims the priority benefit of U.S. Provisional Patent Application Ser. No. 62/104,092, filed on Jan. 16, 2015, the disclosures of which are incorporated herein by reference.

TECHNICAL FIELD

The present disclosure relates to wireless power, and more particularly, to a wireless power transmission apparatus and a coil structure for implementing the wireless power transmission apparatus.

BACKGROUND

Generally, in order for a portable terminal such as a mobile phone, a notebook, and a PDA to be charged, the portable terminal needs to receive electric energy (or electric power) from an external charger. The portable terminal includes a battery cell for storing electric energy that supplied and a circuit for charging and discharging (supplying electric energy to the portable terminal) of the battery cell.

An electrical connection may be used to provide electrical energy from a charger to the battery cell. Some charging systems utilize a terminal supply method in which commercial power is converted into a voltage and a current corresponding to the battery cell to produce the electrical energy which is supplied to the battery cell through a terminal of the battery cell.

This terminal supply method is accomplished by the use of physical cables or wires. Accordingly, when the terminal supply method is used with many portable devices, the cables or wires may occupy a considerable workspace. Furthermore, the cables or wires may be difficult to arrange, potentially deteriorating the appearance of the workspace. Also, the terminal supply method may cause limitations such as an instantaneous discharge phenomenon due to potential differences between terminals, a burnout and fire due to sticking of foreign objects, a natural discharge, or a lifespan and performance reduction of a battery pack, among other examples.

In recent years, wireless charging systems (hereinafter, referred to as wireless power transfer systems) and control methods using the wireless power transmission method and control methods are being proposed in order to overcome the above-mentioned limitations. The wireless power transmission method is also referred to as a contactless power transmission method or a no point of contact power transmission method. The wireless power transfer system includes a wireless power transmission apparatus for supplying electric energy by a wireless power transmission method and a wireless power reception apparatus for receiving electric energy wirelessly supplied from the wireless power transmission apparatus to charge a battery cell. Technologies for wirelessly transmitting power may include magnetic induction coupling or magnetic resonance coupling.

SUMMARY

The present disclosure provides a wireless power transmission apparatus and a hybrid type coil structure for implementing the wireless power transmission apparatus.

The present disclosure also provides a method of performing wireless power transmission based on a hybrid type coil structure.

In one aspect, a wireless power transmission apparatus is provided. The wireless power transmission apparatus includes: a primary core including a primary resonant coil wound in a spiral form and a first inductive coil supplying power to the primary resonant coil in a contactless form with an input terminal or an output terminal of the primary resonant coil and wound in a spiral form on the substantially same plane around the substantially same center point as a center point of the primary resonant coil, and generating at least one of magnetic induction and magnetic resonance by a driving signal to transmit wireless power to a wireless power reception apparatus; a driving circuit connected to the primary core and applying the driving signal to the primary core; a control circuit connected to the primary core and the driving circuit and providing a control signal for controlling a switch of the primary core; and a measurement circuit for measuring a current or voltage of the primary core.

The wireless power transmission apparatus may further include a plurality of capacitors connected to both ends of the switch of the primary core.

The primary resonant coil and the primary inductive coil may be wound side by side at an inner side close to the center point and the primary resonant coil may be extended and wound at an outer side distant from the center point.

The primary resonant coil may be extended and wound at an inner side close to the center point and the primary resonant coil and the primary inductive coil may be wound side by side at an outer side distant from the center point.

The primary resonant coil and the primary inductive coil may be wound such that a pattern in which the primary inductive coils are dually wound side by side and the primary resonant coil is adjacently wound outside the primary inductive coils wound side by side is repeated at least once.

In another aspect, a wireless power transmission coil structure is provided. The wireless power transmission coil structure includes: a primary resonant coil wound in a spiral form around a center point; a first inductive coil supplying power to the primary resonant coil in a contactless form with an input terminal or an output terminal of the primary resonant coil and wound in a spiral form on the substantially same plane around the substantially same center point as the center point of the primary resonant coil; a switch disposed in parallel with the primary resonant coil to control ON and OFF of the operation of the primary resonant coil; and a capacitor coupled to the primary resonant coil so as to form a magnetic resonance with the primary resonant coil.

Here, the switch may be turned on in a resonant operation mode, and the switch may be turned off in an inductive operation mode.

The switch may include a plurality of Field Effect Transistors (FETs) that maintain a switch-on state regardless of a phase of a voltage applied to the primary resonant coil.

The primary resonant coil and the primary inductive coil may be wound side by side at an inner side close to the center point and the primary resonant coil may be extended and wound at an outer side distant from the center point.

The primary resonant coil may be extended and wound at an inner side close to the center point and the primary resonant coil and the primary inductive coil may be wound side by side at an outer side distant from the center point.

The primary resonant coil and the primary inductive coil may be wound such that a pattern in which the primary inductive coils are dually wound side by side and the primary resonant coil is adjacently wound outside the primary inductive coils wound side by side is repeated at least once.

In another aspect, a wireless power transmission method is provided. The wireless power transmission method includes: transmitting power generated by magnetic induction in a primary inductive coil wound in a spiral form around a center point to a primary resonant coil, here, the primary resonant coil being wound in a spiral form on the same plane around the substantially same center point as the center point and being provided in a contactless form with an input terminal and an output terminal of the primary inductive coil; generating a magnetic resonance in the primary resonant coil and transmitting the power to a wireless power reception apparatus; and controlling ON and OFF of the operation of the primary resonant coil based on a switch disposed in parallel with the primary resonant coil, wherein the controlling of ON and OFF of the operation includes turning on the switch in a resonant operation mode and turning off the switch in an inductive operation mode.

The primary resonant coil and the primary inductive coil may be wound side by side at an inner side close to the center point and the primary resonant coil may be extended and wound at an outer side distant from the center point.

The primary resonant coil may be extended and wound at an inner side close to the center point and the primary resonant coil and the primary inductive coil may be wound side by side at an outer side distant from the center point.

The primary resonant coil and the primary inductive coil may be wound such that a pattern in which the primary inductive coils are dually wound side by side and the primary resonant coil is adjacently wound outside the primary inductive coils wound side by side is repeated at least once.

According to an embodiment, the wireless power can be stably transmitted by maintaining a constant value of the quality factor (Q-factor) of the resonant coil. Also, by implementing two kinds of coils having induction and resonance functions on the same plane, volume and unit cost can be minimized when the product is implemented. On the other hand, induction-based wireless charging and resonance-based wireless charging can be independently implemented by mounting a switch function onto a coil having a resonance function.

BRIEF DESCRIPTION OF THE FIGURES

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

The term 'wireless power' below is used to mean any type of energy associated with an electric field, a magnetic field, and an electromagnetic field transmitted from a wireless power transmission apparatus to a wireless power reception apparatus without the use of physical electromagnetic conductors between the wireless power transmission apparatus and the wireless power reception apparatus. The wireless power may also be referred to as a power signal or wireless energy and may denote an oscillating magnetic flux enclosed by the primary and secondary coils. For example, power conversion in a system to wirelessly charge devices including mobile phones, cordless phones, iPods, MP3 players, headsets and the like will be described herein. In this disclosure, the basic principles of wireless power transmission include, for example, both magnetic induction coupling and magnetic resonance coupling that uses frequencies of less than 30 MHz. However, various frequencies at which license-exempt operations at relatively high radiation levels, for example, less than 135 kHz (low frequency, LF) or at 13.56 MHz (high frequency, HF) are allowed may be used.

Figure 1:
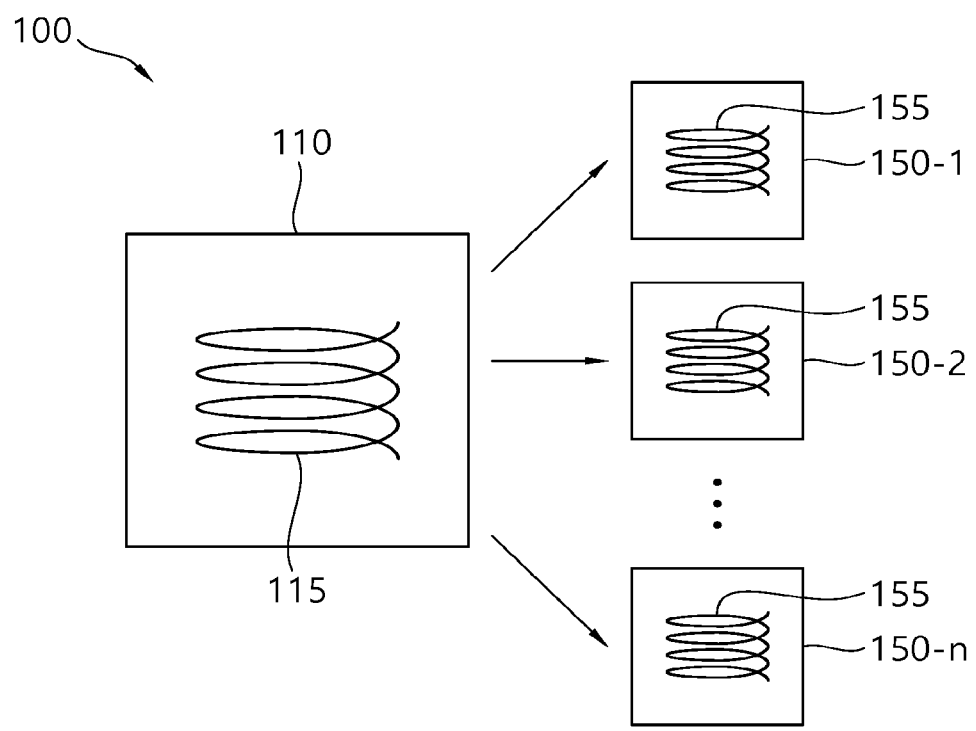
FIG. 1 a view illustrating components of a wireless power transfer system according to an embodiment of the present disclosure.

FIG. 1 a view illustrating components of a wireless power transfer system according to an embodiment of the present disclosure.

Referring to FIG. 1, a wireless power transfer system 100 may include a wireless power transmission apparatus 110 and one or more wireless power reception apparatuses 150-1 to 150-$n$.

The wireless power transmission apparatus 110 includes a primary core. The primary core may include one or more primary coils 115. The primary core may further include at least one capacitor coupled to the primary coil 115. The wireless power transmission apparatus 110 may have any suitable form, but one preferred form is a flat platform with a power transfer surface. Here, each of the wireless power reception apparatuses 150-1 to 150-$n$ may be located on the platform or therearound.

The wireless power reception apparatuses 150-1 to 150-$n$ are detachable from the wireless power transmission apparatus 110, and each of the wireless power reception apparatuses 150-1 to 150-$n$ includes a secondary core coupled with an electromagnetic field generated by the primary core of the wireless power transmission apparatus 110 when in proximity to the wireless power transmission apparatus 110.

The secondary core may include one or more second coils 155. The secondary core may further include at least one capacitor coupled to the secondary coil 155.

The wireless power transmission apparatus 110 transmits power to the wireless power reception apparatuses 150-1 to 150-n without direct electrical contact. In this case, the primary core and the secondary core are referred to as being magnetic-induction-coupled or magnetic-resonance-coupled to each other. The primary coil 115 or the secondary coil 125 may have any suitable shape. In some implementations, the primary coil 115 and the secondary coil 125 may be copper wires wound around a formation having a high permeability, such ferrite or amorphous metal.

The wireless power reception apparatuses 150-1 to 150-n are connected to an external load (not shown, here, also referred to as an actual load of the wireless power reception apparatus) such as a battery cell, and supply power wirelessly received from the wireless power transmission apparatus 110 to the external load. For example, the wireless power reception apparatuses 150-1 to 150-n may each carry received power to an object that consumes or stores power, such as a portable electric or electronic device, or a rechargeable battery cell or battery.

Figure 2:
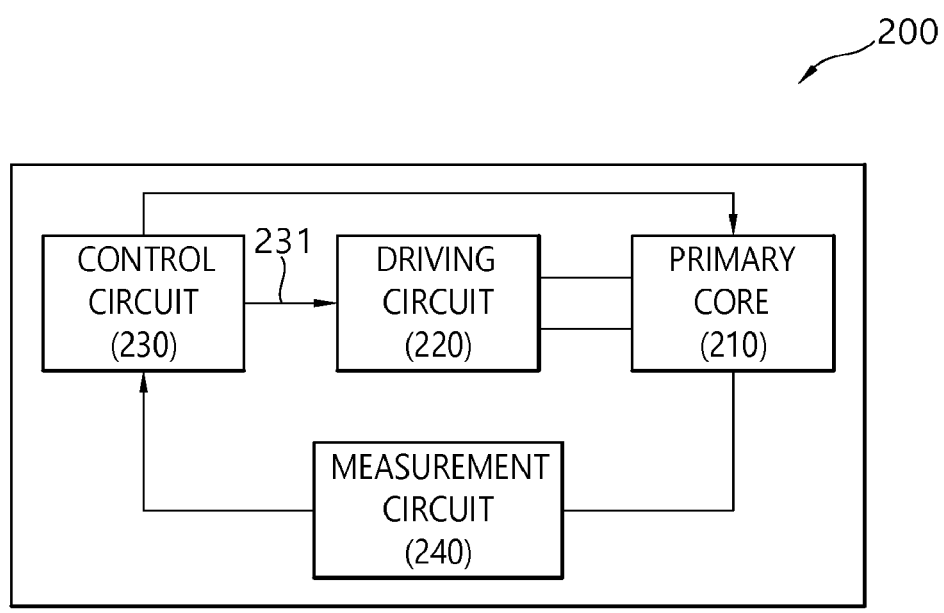
FIG. 2 is a view illustrating a wireless power transmission apparatus according to an embodiment of the present disclosure.

FIG. 2 is a view illustrating a wireless power transmission apparatus according to an embodiment of the present disclosure.

Referring to FIG. 2, a wireless power transmission apparatus 200 includes a primary core 210, a driving circuit 220, a control circuit 230, and a measurement circuit 240.

The primary core 210 includes at least one primary coil. For example, the primary core 210 may include at least one primary resonant coil and at least one primary inductive coil. Thus, the resonant coil and the inductive coil may be included in a single core or as a single module in a single wireless power transmission apparatus. A wireless power transmission apparatus which includes both the resonant coil and the inductive coil may be called a hybrid type. In the hybrid type, the primary resonant coil is a coil used to transmit wireless power to the wireless power reception apparatus by magnetic resonance coupling, and the primary inductive coil is a coil used to transmit wireless power to the wireless power reception apparatus by magnetic induction coupling. The primary core 210 may further include a capacitor coupled to the primary resonant coil so as to form a magnetic resonance with the primary resonant coil. The magnetic induction method may be used to supply or transmit the corresponding power to the primary resonant coil when the primary core 210 transmits wireless power by the magnetic resonance method. Accordingly, the primary inductive coil may also be referred to as a drive coil.

In the hybrid type, at least one primary resonant coil and at least one primary inductive coil may be coupled based on various winding structures and arrangements.

Figure 3:
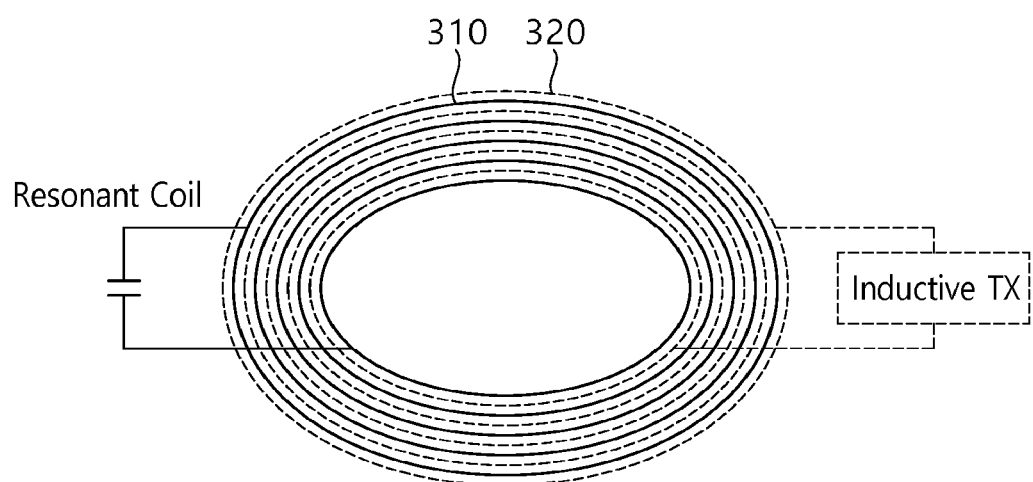
FIG. 3 is a view illustrating a hybrid type according to an embodiment of the present disclosure.

In one aspect, the hybrid type may have the structure of FIG. 3. Referring to FIG. 3, a primary resonant coil 310 and a primary inductive coil 320 are wound on the same plane. That is, the primary resonant coil 310 and the primary inductive coil 320 are disposed so as to be together wound around the substantially same center point on the same plane. Also, the primary resonant coil 310 and the primary inductive coil 320 are wound side by side. In some implementations, the primary resonant coil 310 and the primary inductive coil 320 are wound in a bi-filar type.

The side by side winding of a first coil (such as the primary resonant coil) and a second coil (such as the primary inductive coil) includes at least one repetition of the pattern in which the second coil is wound just outside the winding of the first coil and the first coil is wound just outside the winding of the second coil as shown in FIG. 3. Also, the bi-filar type means that two independent coils are wound adjacent to each other in parallel. Accordingly, the bi-filar type is provided with two inputs and two outputs, respectively. The form in which two coils are wound side by side may be called the bi-filar type.

Although physically adjacent to each other, the primary resonant coil 310 and the primary inductive coil 320 may not be electrically connected to each other. The primary resonant coil 310 and the primary inductive coil 320 may each have a spiral shape. A capacitor forming a magnetic resonance with the primary resonant coil 310 may be coupled to both ends of the primary resonant coil 310.

Thus, when the inductive coil and the resonant coil are separated or distant from each other on different planes, the thickness (or height) of the primary core may increase, thereby potentially increasing the volume and cost of the wireless power transmission apparatus. However, according to the structure shown in FIG. 3, even though the inductive coil and the resonant coil are separated from each other, since the inductive coil and the resonant coil are coupled on the same plane, an increase of thickness can be prevented, thereby potentially reducing the volume and cost of the hybrid type wireless power transmission apparatus. Also, since the variation of the Q-factor of the resonant coil due to the load modulation can be minimized and the resonant coil and the inductive coil can be individually controlled, simultaneous power control can be easily performed. The disclosed design may improve the efficiency of wireless power transfer or increase a distance between the wireless power transmission apparatus and the wireless power reception apparatus.

Figure 4:
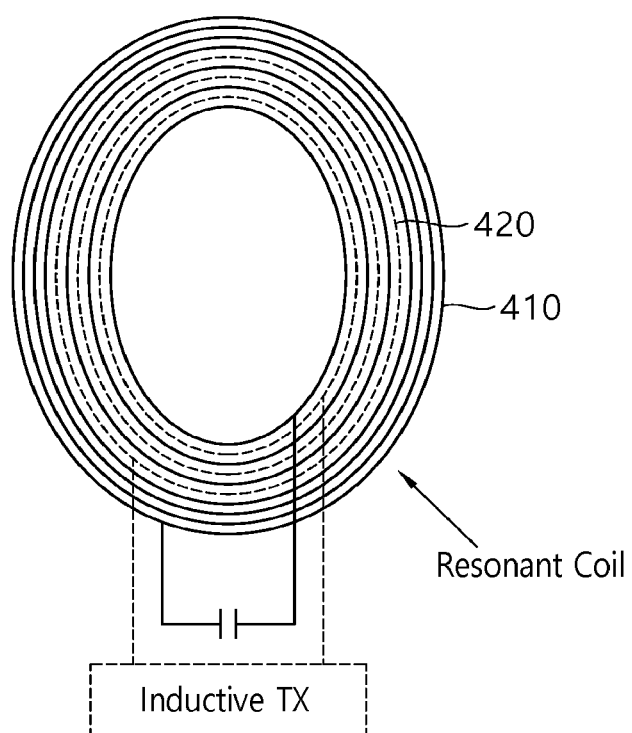
FIG. 4 is a view illustrating a hybrid type according to another embodiment of the present disclosure.

In another aspect, at least one primary resonant coil and at least one primary inductive coil may have the coupling structure of FIG. 4. Referring to FIG. 4, a primary resonant coil 410 and a primary inductive coil 420 are wound on the same plane. That is, the primary resonant coil 410 and the primary inductive coil 420 are disposed so as to be together wound around the substantially same center point on the same plane. Also, the primary resonant coil 410 is configured to be separately extended to be wound around the outer side of the primary inductive coil 420 and thus match the wavelength of the primary resonant coil 410 with the resonance frequency. In other words, the primary resonant coil 410 and the primary inductive coil 420 are wound side by side from the center point to the radius r (inward), and only the primary resonant coil 410 is wound from the radius r to the radius r'(>r)(outward). Accordingly, the winding interval of the primary resonant coil 410 on the inner side is larger than the winding interval of the primary resonant coil 410 on the outer side. In other words, the first resonant coil 410 has a wider winding interval from the inner side to the outer side. This is because, at the inner side, the primary inductive coil 420 is interposed in every winding (that is, between the windings) of the primary resonant coil 410.

This hybrid type includes a primary inductive coil 420 configured to be wound in a spiral form at the inner side and generate power to be transmitted to the wireless power reception apparatus and a primary resonant coil 410 wound side by side together with the primary inductive coil 420 at the inner side of the same center on the substantially same plane and separately wound at the outer side to deliver the generated power to a wireless power reception apparatus. Although physically adjacent to each other, the primary resonant coil 410 and the primary inductive coil 420 may not be electrically connected to each other. The primary resonant coil 410 and the primary inductive coil 420 may each have a spiral shape. A capacitor forming a magnetic resonance with the primary resonant coil 410 may be coupled to both ends of the primary resonant coil 410. It can be seen that the hybrid type of FIG. 4 has a structure as shown in FIG. 5 when the input and output terminals are separated into the inner side and the outer side.

Figure 5:
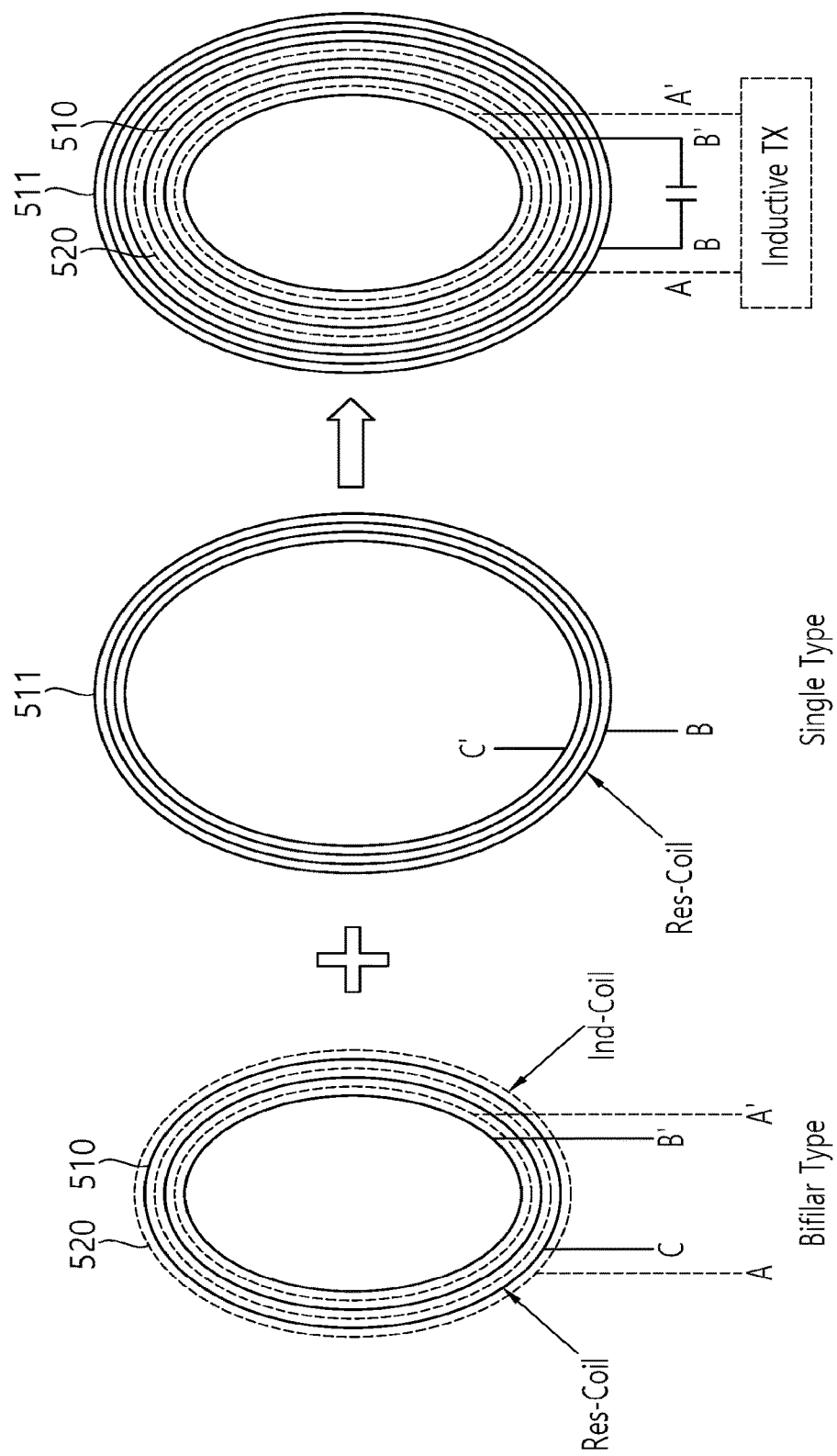
FIG. 5 is a view illustrating the hybrid type of FIG. 4 whose input/output terminals are separated into an inner side and an outer side.

Referring to FIG. 5, a primary inner resonant coil 510 and a primary inductive coil 520 are wound side by side at the inner side on the substantially same plane around the substantially same center point. That is, at the inner side, the primary inner resonant coil 510 and the primary inductive coil 520 are wound in a bi-filar type, and terminals A and A' are the input and output of the primary inductive coil 520, respectively. Also, terminals C and B' are the input and output of the primary internal resonant coil 510, respectively. On the other hand, at the outer side, only the primary outer resonant coil 511 is wound in a single type, and terminals B and C' are the input and the output of the primary outer resonant coil 511, respectively. The terminal C is connected to the terminal C' such that the primary inner resonant coil 510 and the primary outer resonant coil 511 are electrically connected to each other to form a primary resonant coil. Meanwhile, the connection relation of remaining inputs and outputs are as follows. Terminals A and A' are connected to a structure (inductive Tx) for generating and transmitting power based on the magnetic induction as the input and the output, respectively. The terminal B of the primary inner resonant coil 510 of the bi-filar type and the terminal B' of the primary outer resonant coil 511 of the single type are connected to a capacitor for constituting a resonance circuit together with the primary resonant coil, respectively.

Here, the length of the primary resonant coil may be designed and manufactured in accordance with the wavelength of the resonance frequency so as to optimize the resonant power radiation. For example, when the wavelength of the resonance frequency is k, the length of the primary resonant coil may have a value obtained by dividing the wavelength of the resonance frequency by the power of 2 such as $\lambda$, $\lambda/2$, $\lambda/4$, $\lambda/8$, and $\lambda/2n$.

Thus, when the primary inductive coil and the primary resonant coil are functionally and physically separated as a bi-filar type, there is an effect of becoming insensitive to changes in impedance and/or load between the wireless power transmission apparatus and the wireless power reception apparatus. Furthermore, by maintaining a constant value of the quality factor (Q-factor) of the resonant coil, the wireless power can be stably transmitted. Also, by implementing two kinds of coils having induction and resonance functions on the same plane, volume and unit cost can be minimized when the product is implemented. On the other hand, induction-based wireless charging and resonance-based wireless charging can be independently implemented by mounting a switch function onto a coil having a resonance function.

Figure 6:
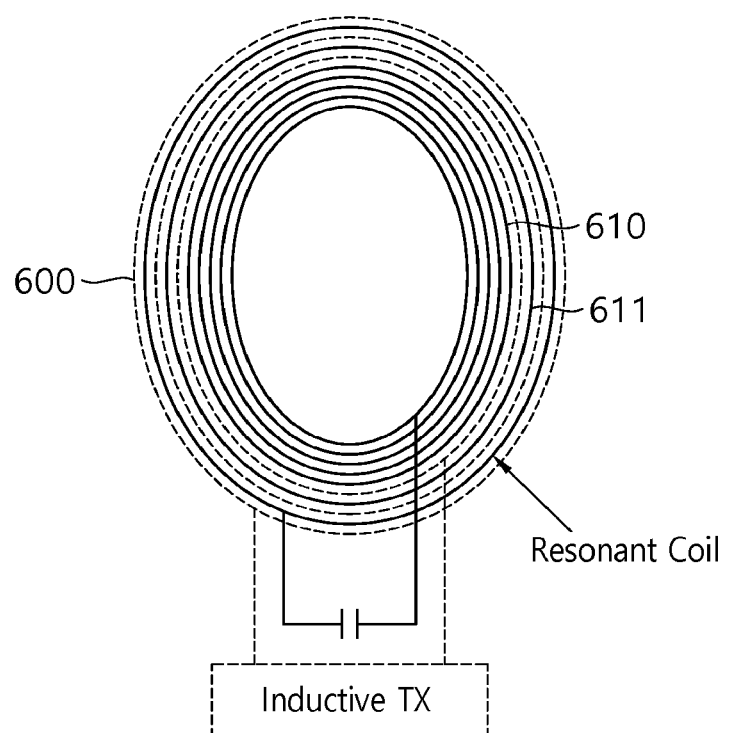
FIG. 6 is a view illustrating a hybrid type according to another embodiment of the present disclosure.

In another aspect, at least one primary resonant coil and at least one primary inductive coil may have the coupling structure of FIG. 6.

Referring to FIG. 6, primary resonant coils 610 and 611 and a primary inductive coil 620 are wound on the same plane. That is, the primary resonant coils 610 and 611 and the primary inductive coil 620 are disposed so as to be together wound around the substantially same center point on the same plane. Also, the primary inner resonant coil 610 is configured to be separately extended and wound in the inner side of the primary inductive coil 620 and thus match the wavelength of the primary resonant coils 610 and 611 with the resonance frequency. In other words, the primary inner resonant coil 610 is wound alone from the center point to the radius r (inward), and the primary inductive coil 620 and the primary outer resonant coil 611 are together wound side by side from the radius r to the radius r'(>r)(outward). Accordingly, the winding interval of the primary resonant coil 610 on the outer side is larger than the winding interval of the primary resonant coil 610 on the inner side. In other words, the first resonant coil 610 has a narrower winding interval from the inner side to the outer side. This is because, at the outer side, the primary inductive coil 620 is interposed in every winding (that is, between the windings) of the primary resonant coil 610.

This hybrid type includes a primary inner resonant coil 610 configured to be wound in a spiral form at the inner side to transmit power to the wireless power reception apparatus and a primary inductive coil 620 configured to be wound side by side together with the primary outer resonant coil 611 at the outer side around the substantially same center point on the substantially same plane as the primary inner resonant coil 610 to generate and deliver the power.

Figure 7:
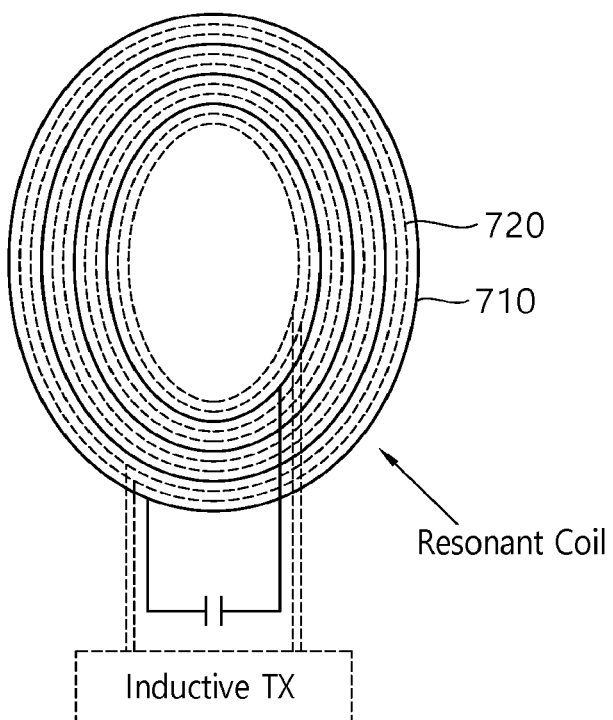
FIG. 7 is a view illustrating a hybrid type according to another embodiment of the present disclosure.

In another aspect, at least one primary resonant coil and at least one primary inductive coil may have the coupling structure of FIG. 7.

Referring to FIG. 7, a primary resonant coil 710 and a primary inductive coil 720 are wound on the same plane. That is, the primary resonant coil 710 and the primary inductive coil 720 are disposed so as to be together wound around the substantially same center point on the same plane. The primary inductive coil 720 is wound in the bi-filar type, two of which are wound side by side in parallel with the primary resonant coil 710. The primary inductive coils 720 of the bi-filar type are wound side by side together with a single filament of the primary resonant coil 710. In other words, a pattern in which the primary inductive coils 720 are dually wound and the primary resonant coil 710 is wound just outside the primary inductive coil 720 is repeated at least one time. Thus, the form in which three coils are wound side by side may be called the tri-filar type. In the tri-filar type, one winding is added to the bi-filar type, and three independent coils are wound in parallel adjacent to each other. Accordingly, the tri-filar type is provided with three inputs and three outputs. In FIG. 7, the primary resonant coil 710 of the bi-filar type and the primary resonant coil 710 of the single type are combined to implement the tri-filar type. On the contrary to this, the primary resonant coil 710 of the bi-filar type and the primary inductive coil 720 of the single type may be combined to implement a tri-filar type.

Referring again to FIG. 2, the primary core 210 may include a plurality of primary coils, at least one capacitor coupled to the plurality of primary coils, and at least one switch (not shown) that performs switching of the plurality of primary coils. The primary core 210 generates an electromagnetic field according to a driving signal applied from the driving circuit 220 and transmits wireless power to the wireless power reception apparatus through the electromagnetic field.

Figure 8:
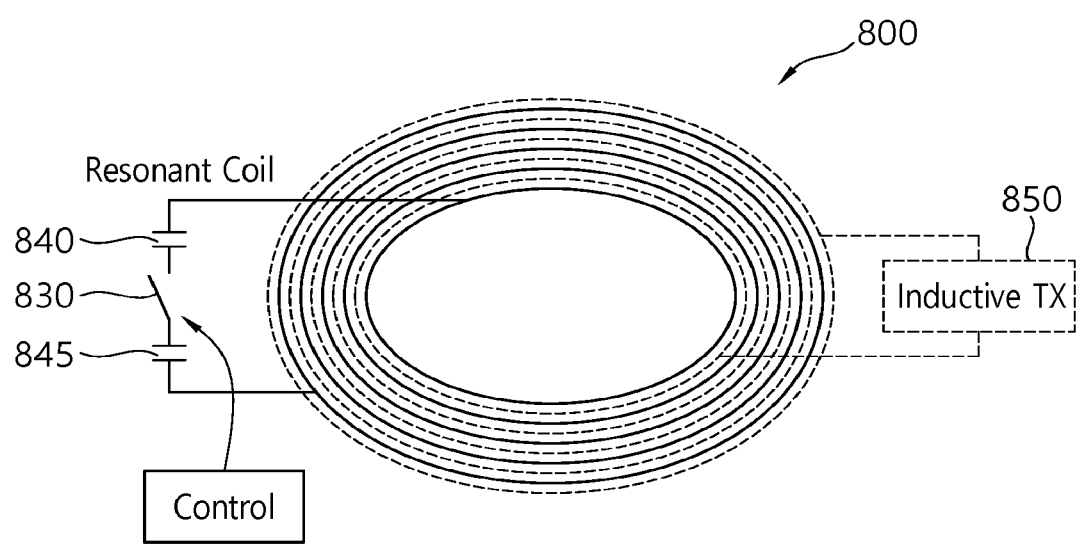
FIG. 8 is a view illustrating a primary core including at least one switch according to an embodiment of the present disclosure.

FIG. 8 is a view illustrating a primary core including at least one switch according to an embodiment of the present disclosure.

Referring to FIG. 8, a primary core 800 may include a hybrid type coil structure in which a primary inductive coil and a primary resonant coil are coupled, a structure (inductive Tx) 850 for generating and transmitting power based on magnetic induction, a switch 830 for performing switching of the primary resonant coil, and a plurality of capacitors 840 and 845 connected to both ends of the switch 830. All of the hybrid types disclosed in this specification may be applied to the hybrid type coil structure of FIG. 8.

As an example of the operation of the switch 830, the switch 830 is turned off in a first wireless power transmission mode and is turned on in a second wireless power transmission mode. Here, the first wireless power transmission mode is a mode in which wireless power transmission by the magnetic induction method is performed but wireless power transmission by the magnetic resonance method is not performed, that is, a mode in which only the first inductive coil operates. Also, the second wireless power transmission mode is a mode in which wireless power transmission by the magnetic resonance method is performed and is a mode in which the primary resonant coil operates. In the second wireless power transmission mode, the wireless power transmission by the magnetic induction method as well as the magnetic resonance method may be together performed. In this case, both the primary resonant coil and the primary inductive coil may operate. The switch 830 may be turned on or off according to the kind of coil used for the wireless power transmission mode. Also, a control signal for controlling the switch 830 is sent to the switch 830. This control signal may be provided by the control circuit 230.

Figure 9:
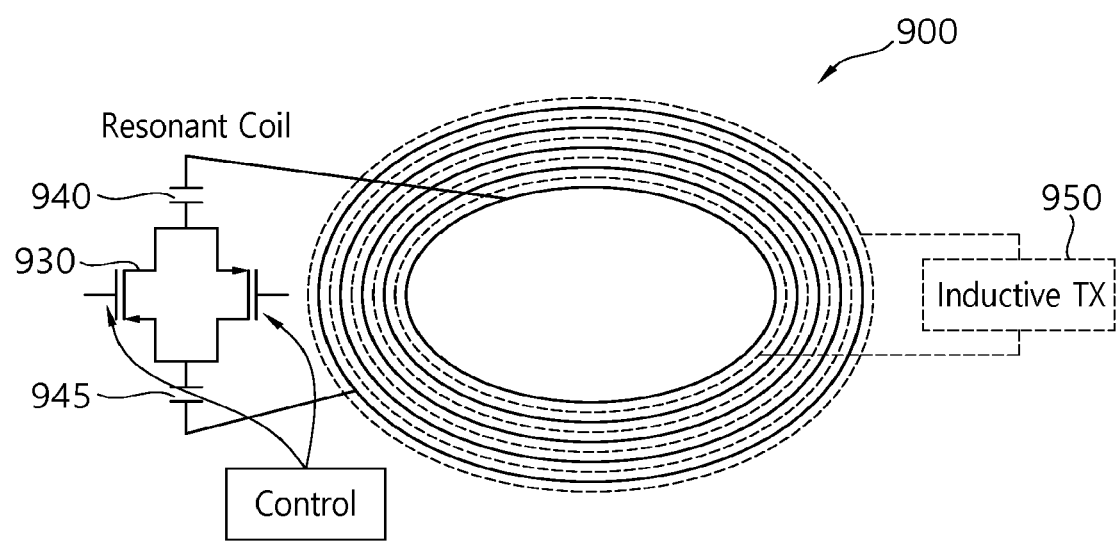
FIG. 9 is a view illustrating a primary core including at least one switch according to another embodiment of the present disclosure.

FIG. 9 is a view illustrating a primary core including at least one switch according to another embodiment of the present disclosure.

Referring to FIG. 9, a primary core 900 may include a hybrid type coil structure in which a primary inductive coil and a primary resonant coil are coupled, a structure (inductive Tx) 950 for generating and transmitting power based on magnetic induction, a switch 930 for performing switching of the primary resonant coil, and a plurality of capacitors 940 and 945 connected to both ends of the switch 930. All of the hybrid types disclosed in this specification may be applied to the hybrid type coil structure of FIG. 9.

Unlike the switch 830 shown in FIG. 8, the switch 930 has a structure in which two Field Effect Transistors (FETs) are configured in parallel in both directions of a primary resonant coil. Thus, even though a voltage applied to the primary resonant coil or the phase of the voltage of the primary resonant coil is changed, the switch-on state is maintained.

As an example of the operation of the switch 930, the FETs are turned off in a first wireless power transmission mode and are turned on in a second wireless power transmission mode. Here, the first wireless power transmission mode is a mode in which wireless power transmission by the magnetic induction method is performed but wireless power transmission by the magnetic resonance method is not performed, that is, a mode in which only the first inductive coil operates. Also, the second wireless power transmission mode is a mode in which wireless power transmission by the magnetic resonance method is performed and is a mode in which the primary resonant coil operates. In the second wireless power transmission mode, the wireless power transmission by the magnetic induction method as well as the magnetic resonance method may be together performed. In this case, both the primary resonant coil and the primary inductive coil may operate. The FETs may be turned on or off according to the kind of coil used for the wireless power transmission mode. Also, a control signal for controlling the switch 930 is sent to the switch 930. This control signal may be provided by the control circuit 230.

Referring again to FIG. 2, the driving circuit 220 is connected to the primary core 210 and applies driving signals to the primary core 210.

The control circuit 230 is connected to the driving circuit 220 and generates a control signal 231 that controls an AC signal produced when the primary core 210 generates an induction magnetic field or incurs a magnetic resonance. The control circuit 230, as a sort of processor, may include Application-Specific Integrated Circuits (ASICs), other chip sets, logic circuits and/or data processing devices.

Figure 10:
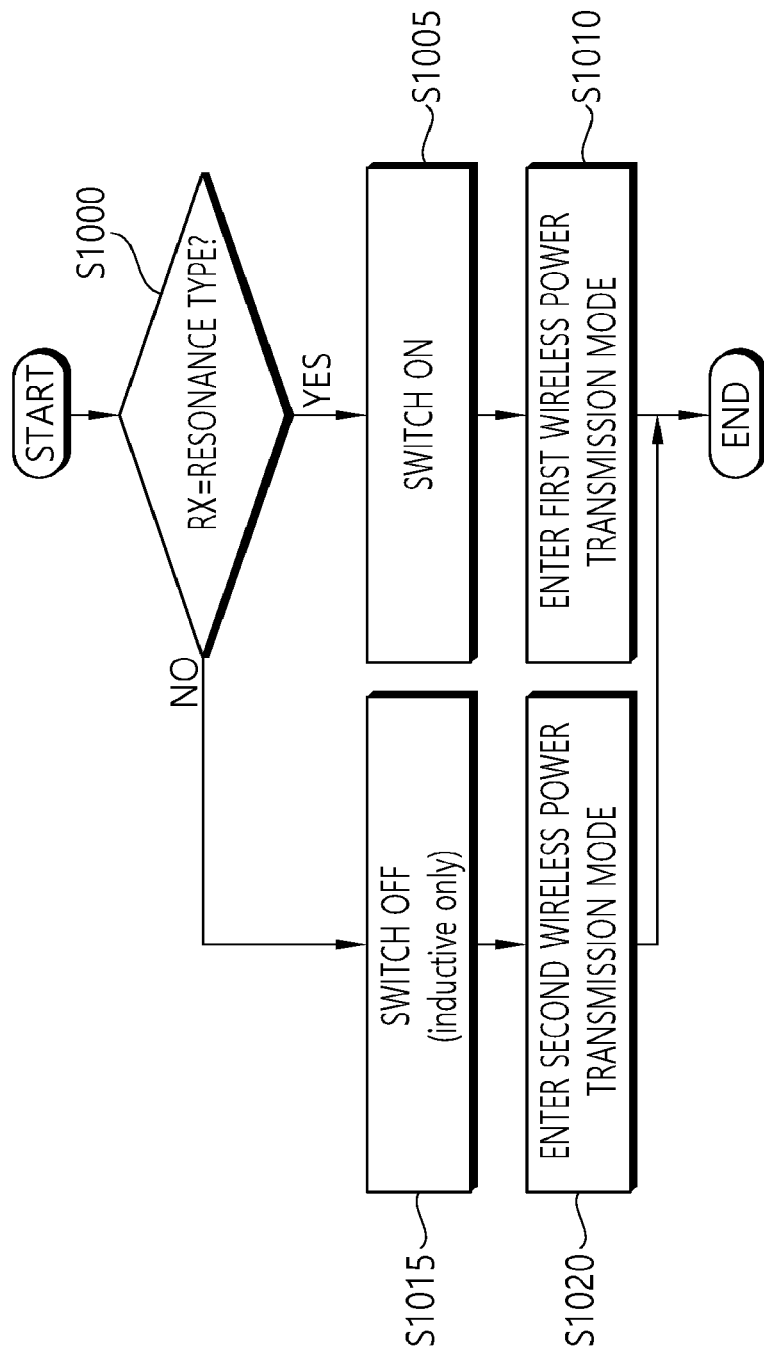
FIG. 10 is a flowchart illustrating an operation for driving a hybrid type of coil according to an embodiment of the present disclosure.

Also, the control circuit 230 may be connected to the primary core 210 to provide a control signal for controlling a switch of the primary core 210. Particularly, when the primary coil included in the primary core 210 is a hybrid type, the control circuit 230 may perform an operation for driving a hybrid type of coil. As an example, the control circuit 230 performs operations according to the procedure shown in FIG. 10. Referring to FIG. 10, the control circuit 230 determines whether or not the wireless power reception apparatus is a magnetic resonance-based wireless power reception apparatus (S1000). That is, the control circuit 230 checks whether or not the wireless power reception apparatus Rx is a resonance type. If the wireless power reception apparatus is a resonance type, the control circuit 230 sends a control signal for turning on the switch to the primary core 210 (S1005). That is, the primary core 210 turns on the switch, and thus the wireless power transmission apparatus enters the second wireless power transmission mode (S1010).

On the other hand, if the wireless power reception apparatus is an induction type, the control circuit 230 sends a control signal for turning off the switch to the primary core 210 (S1015). That is, the primary core 210 turns off the switch, and thus the wireless power transmission apparatus enters the first wireless power transmission mode (S1020).

The measurement circuit 240 measures a current or a voltage flowing in the primary coil. In particular, the current measured by the measurement circuit 240 may be an alternating current. The measurement circuit 240 may be a current sensor or a voltage sensor. Alternatively, the measurement circuit 240 may lower a high current flowing in the primary coil to a low current for use or may be a transformer that lowers a high voltage applied to the primary coil to a low voltage.

Although not shown in the drawings, the wireless power transmission apparatus 200 may further include at least one of a storage device and a communication module wirelessly exchanging data with the wireless power reception apparatus. The communication module may include a Radio Frequency (RF) antenna for transmitting or receiving a signal and a circuit for processing a wireless signal. The storage device may include disk drives, Read-Only Memories (ROMs), Random Access Memories (RAMs), flash memories, memory cards, and storage media.

Figure 11:
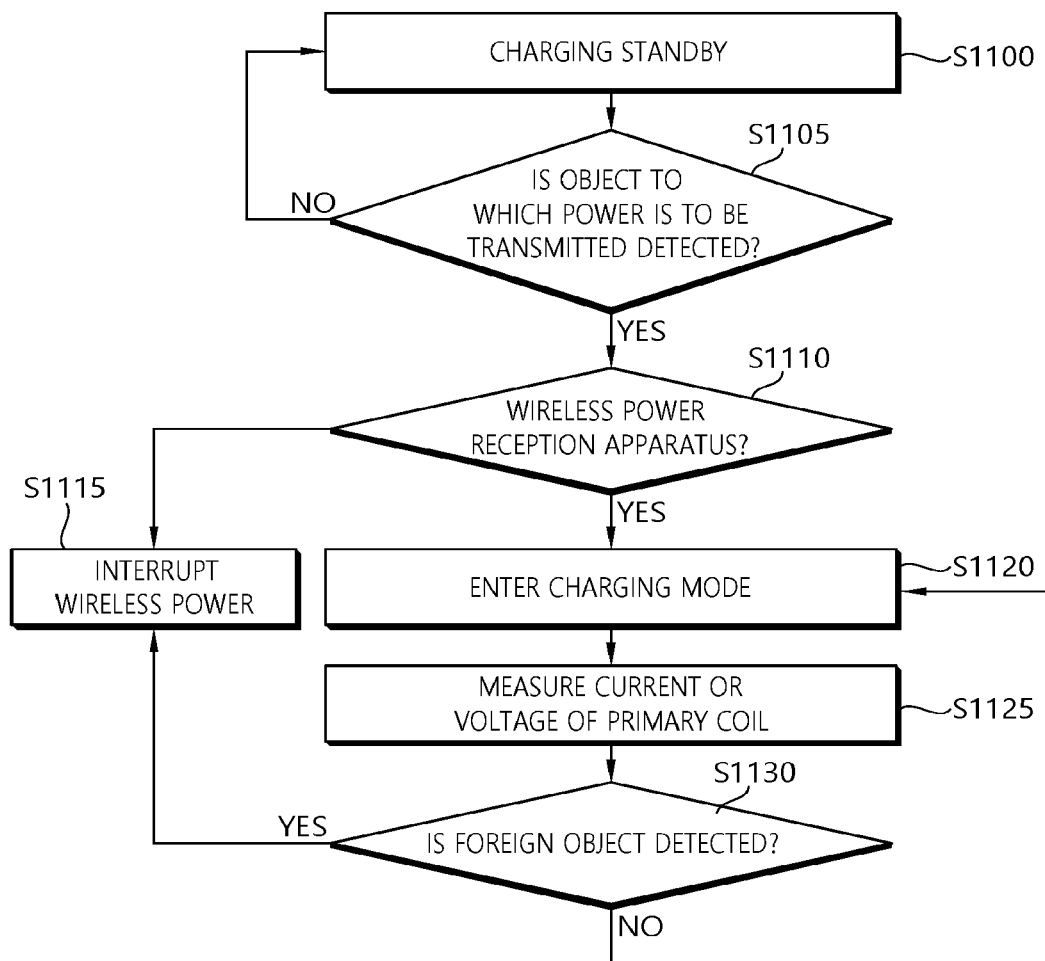
FIG. 11 is a flowchart illustrating an operation of a wireless power transmission apparatus according to an embodiment of the present disclosure.

FIG. 11 is a flowchart illustrating an operation of a wireless power transmission apparatus according to an embodiment of the present disclosure.

Referring to FIG. 11, the wireless power transmission apparatus is in a charging standby state until a wireless power reception apparatus is detected (S1100). This state may be referred to as a selection phase.

At this time, the wireless power transmission apparatus continuously detects an object to which power is to be transmitted (S1105). This state may be referred to as a ping phase. In operation S1105, the wireless power transmission apparatus performs an object detection operation.

If an object is not detected, the wireless power transmission apparatus returns to the charging standby state (S1100).

If an object is detected, the wireless power transmission apparatus determines whether or not the detected object is a wireless power reception apparatus capable of receiving wireless power (S1110). This state may be referred to as an identification phase or an identification and negotiation phase. In the identification phase, the wireless power transmission apparatus may receive various kinds of information related to the wireless power reception apparatus from the wireless power reception apparatus. Also, in the negotiation phase, the wireless power transmission apparatus and the wireless power reception apparatus may exchange various kinds of information required for wireless charging with each other. In order to exchange information, the wireless power transmission apparatus and the wireless power reception apparatus may use a load modulation method through the primary core, or may include a separate communication module (such as, Bluetooth™) to perform communication.

If the detected object is not a wireless power reception apparatus, the wireless power transmission apparatus interrupts power (S1115).

If the detected object is a wireless power reception apparatus, the wireless power transmission apparatus enters the charging mode (S1120). In the charging mode, the wireless power transmission apparatus applies electric power to the primary core to generate magnetic induction or magnetic resonance. In particular, when the primary coil included in the primary core is a hybrid type, the wireless power transmission apparatus may additionally perform the operations according to the procedure shown in FIG. 10.

The wireless power transmission apparatus measures a current flowing in the primary coil, or a voltage applied to the primary coil (S1125).

When a foreign object is detected, the wireless power transmission apparatus interrupts wireless power that is being transmitted to the wireless power reception apparatus (S1115). The detecting of foreign object may be performed before operation S1120.

On the other hand, when a foreign object is not detected, the wireless power transmission apparatus may continuously transmit power to the wireless power reception apparatus (S1130).

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents. Therefore, the present disclosure covers all embodiments falling within the scope of the following claims, rather than being limited to the above-described embodiments.

What is claimed is:

1. A wireless power transmission apparatus comprising:
a primary resonant coil capable of transmitting wireless power to a first type of wireless power reception apparatus via magnetic resonance coupling;
at least one switch connected to the primary resonant coil and configured to enable or disable operation of the primary resonant coil;
a primary inductive coil capable of transmitting wireless power to a second type of wireless power reception apparatus via magnetic induction coupling, wherein the primary inductive coil transmits wireless power to the primary resonant coil via magnetic induction coupling when the at least one switch enables operation of the primary resonant coil;
a driving circuit connected to the primary inductive coil and configured to supply a driving signal to the primary inductive coil; and
a control circuit coupled with the at least one switch and configured to control the at least one switch to enable or disable the operation of the primary resonant coil based on a determination that the wireless power reception apparatus is the first type or the second type, respectively.

2. The wireless power transmission apparatus of claim 1, wherein the primary resonant coil and the primary inductive coil are included as a single module in the wireless power transmission apparatus.

3. The wireless power transmission apparatus of claim 1, wherein the primary resonant coil and the primary inductive coil are wound side by side in a spiral form on a same plane around a same center point.

4. The wireless power transmission apparatus of claim 1, further comprising at least one capacitor connected to an end of the primary resonant coil to form a magnetic resonance of the primary resonant coil.

5. The wireless power transmission apparatus of claim 1, wherein the wireless power transmission apparatus is capable of concurrently transmitting wireless power via magnetic resonance coupling and magnetic induction coupling, respectively, when the driving circuit supplies the driving signal to the primary inductive coil and the at least one switch is configured to enable the operation of the primary resonant coil.

6. The wireless power transmission apparatus of claim 1, wherein the primary resonant coil and the primary inductive coil are formed by bi-filar copper wires that are not electrically connected to each other.

7. The wireless power transmission apparatus of claim 1, wherein the primary resonant coil and the primary inductive coil are wound side by side at an inner side close to a center point and the primary resonant coil is extended and wound at an outer side distant from the center point.

8. The wireless power transmission apparatus of claim 1, wherein the primary resonant coil is extended and wound at an inner side close to a center point and the primary resonant coil and the primary inductive coil are wound side by side at an outer side distant from the center point.

9. The wireless power transmission apparatus of claim 1, wherein a length of the primary resonant coil is based on a wavelength of a resonance frequency.

10. A primary core for use in a wireless power transmission apparatus comprising:
a primary resonant coil for use in a resonant wireless power transmission mode;
a primary inductive coil for use in an inductive wireless power transmission mode;
a switch connected to the primary resonant coil to enable or disable the resonant wireless power transmission mode based on a control signal from a control circuit of the wireless power transmission apparatus; and
a capacitor coupled to the primary resonant coil so as to form a magnetic resonance with the primary resonant coil when the resonant wireless power transmission mode is enabled.

11. The primary core of claim 10, wherein the primary resonant coil and the primary inductive coil are wound in a spiral form on a same plane around a common center point.

12. The primary core of claim 10, wherein the switch comprises a plurality of Field Effect Transistors (FETs) that maintain a switch-on state regardless of a phase of a voltage applied to the primary resonant coil.

13. The primary core of claim 10, wherein the primary inductive coil is configured to supply power to the primary resonant coil in a contactless form with an input terminal or an output terminal of the primary resonant coil when the resonant wireless power transmission mode is enabled.

14. The primary core of claim 10, wherein the primary resonant coil and the primary inductive coil are wound side by side at an inner side close to a center point and the primary resonant coil is extended and wound at an outer side distant from the center point.

15. The primary core of claim 10, wherein the primary resonant coil is extended and wound at an inner side close to a center point and the primary resonant coil and the primary inductive coil are wound side by side at an outer side distant from the center point.

16. The primary core of claim 10, wherein the primary resonant coil and the primary inductive coil are wound such that a pattern in which the primary inductive coil is dually wound side by side and the primary resonant coil is adjacently wound outside the primary inductive coil is repeated at least once.

17. The primary core of claim 10, wherein a length of the primary resonant coil is based on a wavelength of a resonance frequency for the resonant wireless power transmission mode.

18. A method for transmitting wireless power by a wireless power transmission apparatus, the method comprising:
    detecting a wireless power reception apparatus in proximity to a primary core of the wireless power transmission apparatus, wherein the primary core includes a primary inductive coil and a primary resonant coil;
    determining whether the wireless power reception apparatus is a resonance type or an inductance type; and
    controlling a switch connected to the primary resonant coil of the primary core, wherein controlling the switch includes enabling the primary resonant coil when the wireless power reception apparatus is the resonance type.

19. The method of claim 18, further comprising supplying power from the primary inductive coil to the primary resonant coil in a contactless form with an input terminal or an output terminal of the primary resonant coil when the wireless power reception apparatus is the inductance type.

20. The method of claim 18, further comprising concurrently transmitting wireless power via the primary resonant coil and the primary inductive coil.

* * * * *